(12) United States Patent
Wang

(10) Patent No.: US 8,988,580 B2
(45) Date of Patent: Mar. 24, 2015

(54) PROJECTOR DEVICE AND METHOD FOR PROJECTING PICTURES ON A PROJECTION SCREEN

(71) Applicant: Chi Mei Communication Systems, Inc., New Taipei (TW)

(72) Inventor: Hsin-Wei Wang, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 0 days.

(21) Appl. No.: 13/869,782

(22) Filed: Apr. 24, 2013

(65) Prior Publication Data

US 2014/0028886 A1 Jan. 30, 2014

(30) Foreign Application Priority Data

Jul. 25, 2012 (TW) ............................. 101126714 A

(51) Int. Cl.
*H04N 5/222* (2006.01)
*H04N 5/228* (2006.01)
*H04N 9/31* (2006.01)

(52) U.S. Cl.
CPC ........... *H04N 9/3191* (2013.01); *H04N 9/3147* (2013.01); *H04N 9/3185* (2013.01); *H04N 2201/0096* (2013.01)
USPC .................................. 348/333.1; 348/222.1

(58) Field of Classification Search
CPC ............................... H04N 9/31; H04N 9/3191
USPC ................... 348/222.1, 252, 333.1, 744, 838
See application file for complete search history.

(56) References Cited

U.S. PATENT DOCUMENTS

| 7,486,310 | B2 * | 2/2009 | Sakurai et al. | 348/207.99 |
| 8,130,184 | B2 * | 3/2012 | Garner et al. | 345/84 |
| 8,730,130 | B1 * | 5/2014 | Pray et al. | 345/8 |
| 2002/0024640 | A1 * | 2/2002 | Ioka | 353/94 |
| 2006/0267858 | A1 * | 11/2006 | Yun et al. | 345/1.1 |

* cited by examiner

*Primary Examiner* — Trung Diep
(74) *Attorney, Agent, or Firm* — Novak Druce Connolly Bove + Quigg LLP

(57) ABSTRACT

In a method for projecting pictures onto a projection using a projector device, the method triggers a camera of the projector device to capture an image of the projection screen displaying a first picture, and obtains the image of the projection screen from the camera. The method obtains a position, a size and a slant degree of the second picture, and notifies the second electronic device to send the second picture to the projector device. The method processes the second picture according to the obtained position and size and slant degree, and integrates the first picture and the second picture by processing the second picture sent from the electronic device according to the obtained position, size and slant degree, and triggers the first projecting unit to project the integrated picture onto the projection screen.

12 Claims, 3 Drawing Sheets

PROJECTOR DEVICE AND METHOD FOR PROJECTING PICTURES ON A PROJECTION SCREEN

BACKGROUND

1. Technical Field

The embodiments of the present disclosure relate to projection systems and methods, and more particularly to a projector device and method for projecting pictures on a projection screen.

2. Description of Related Art

When projection technology used in handheld devices, small pictures displayed on display screens of the handheld devices may be projected on projection screens, which may improve show of the pictures. However, different users cannot realize interaction with each other on the projection screens using the handheld devices.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module," as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, flash memory, and hard disk drives.

Figure 1:
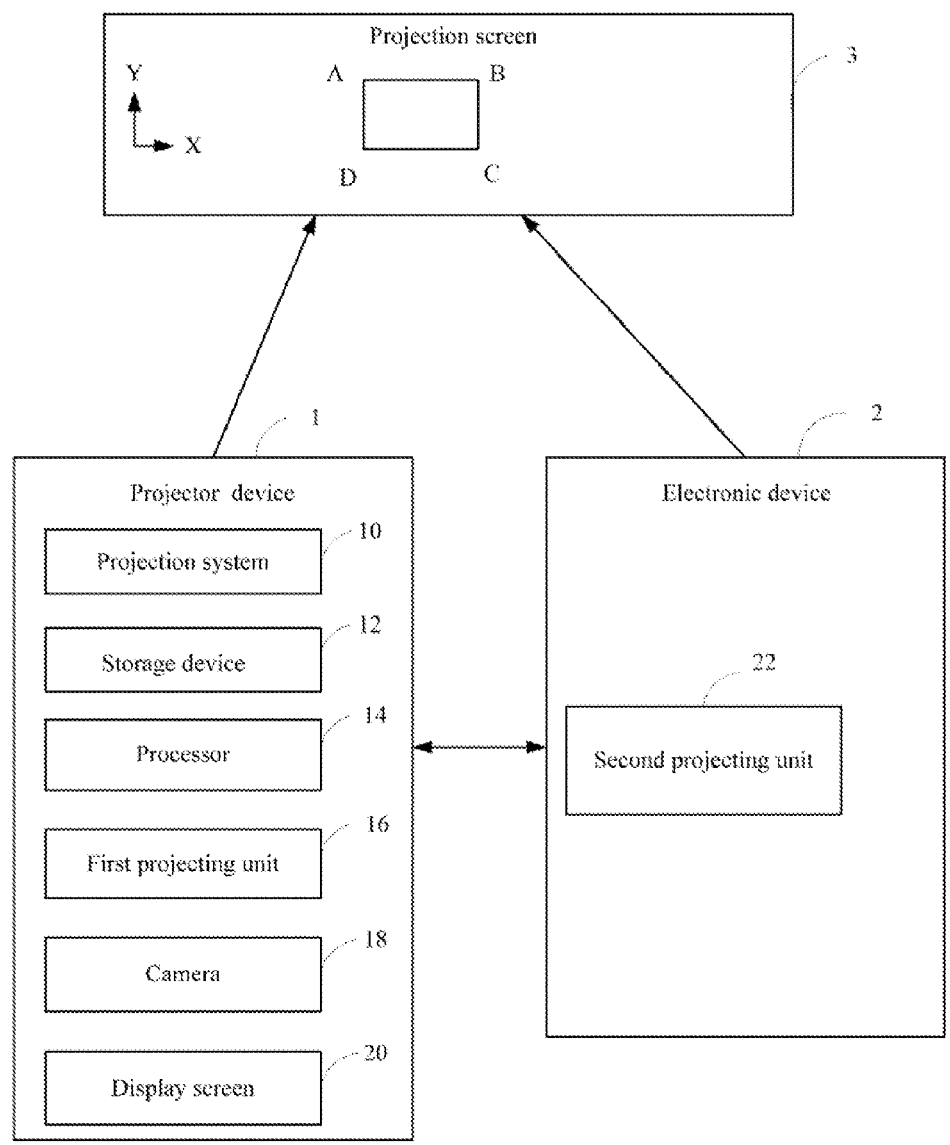
FIG. 1 is a block diagram of one embodiment of a projector device including a projection system.
Figure 2:
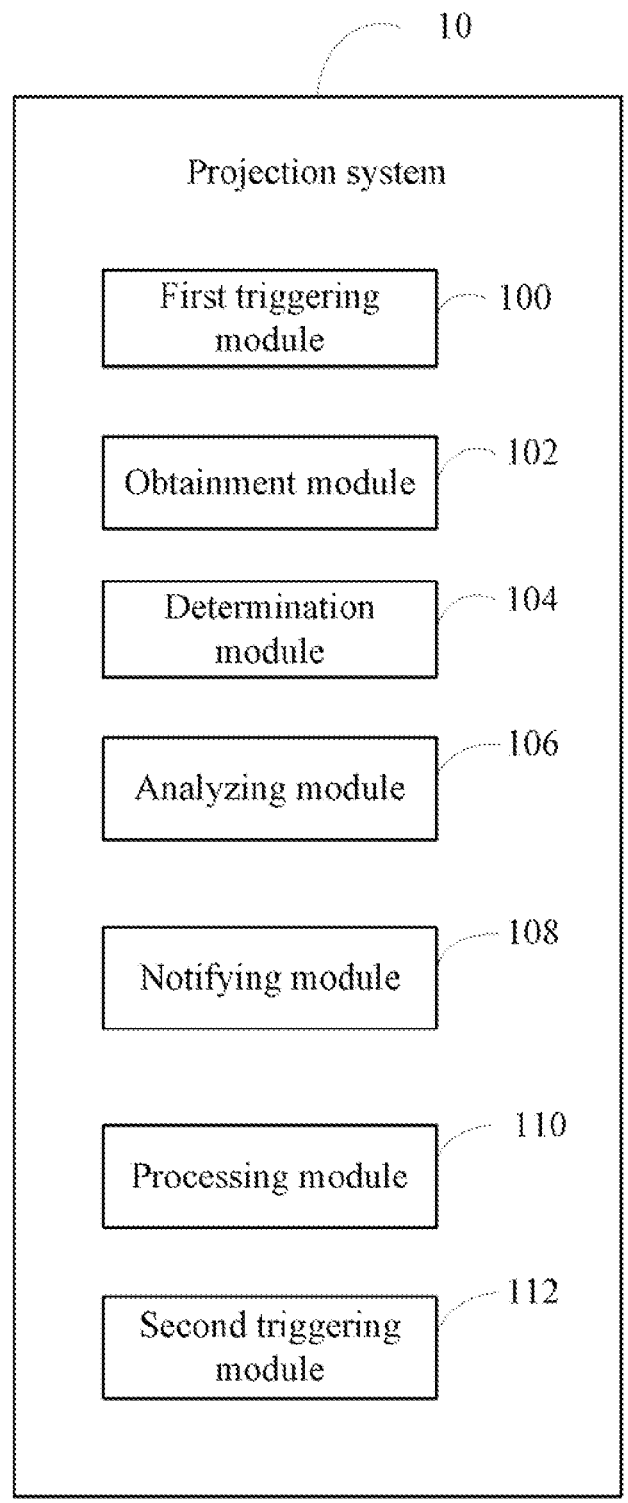
FIG. 2 is a block diagram of one embodiment of function modules of the projection system in FIG. 1.

FIG. 1 is a block diagram of one embodiment of a projector device 1 including a projection system 10. In the embodiment, the projector device 1 communicates with an electronic device 2. The projector device 1 may further include a storage device 12, at least one processor 14, a first projecting unit 16, a camera 18, and a display screen 20. The electronic device 2 may includes a second projecting unit 22. The electronic device 2 may be smart phones, PDA devices, or tablet computers, for example.

In one embodiment, the storage device 12 (non-transitory storage device) may be an internal storage system, such as a random access memory (RAM) for the temporary storage of information, and/or a read only memory (ROM) for the permanent storage of information. In some embodiments, the storage device 12 may be an external storage system, such as an external hard disk, a storage card, or a data storage medium.

The at least one processor 14 may include a processor unit, a microprocessor, an application-specific integrated circuit, and a field programmable gate array, for example.

The first projecting unit 16 projects a first picture displayed on the display screen 20 of the projector device 1 onto a projection screen 3. The projection screen 3 is used for displaying projected picture. The second projecting unit 22 projects a second picture stored in the electronic device 2 onto the projection screen 3.

The camera 18 captures an image of the projection screen 3 when the second projecting unit 22 projects the second picture onto the projection screen 3.

In one embodiment, the projection system 10 includes a plurality of function modules which include computerized codes or instructions that can be stored in the storage device 12 and executed by the at least one processor 14 to provide a method for projecting a picture.

In one embodiment, the projection system 10 may include a first triggering module 100, an obtainment module 102, a determination module 104, an analyzing module 106, a notifying module 108, a processing module 110 and a second triggering module 112. The modules may comprise computerized codes in the form of one or more programs that are stored in the storage device 12 and executed by the at least one processor 14 to provide functions for implementing the modules. The functions of the function modules 100-112 are illustrated in FIG. 3 and described below.

Figure 3:
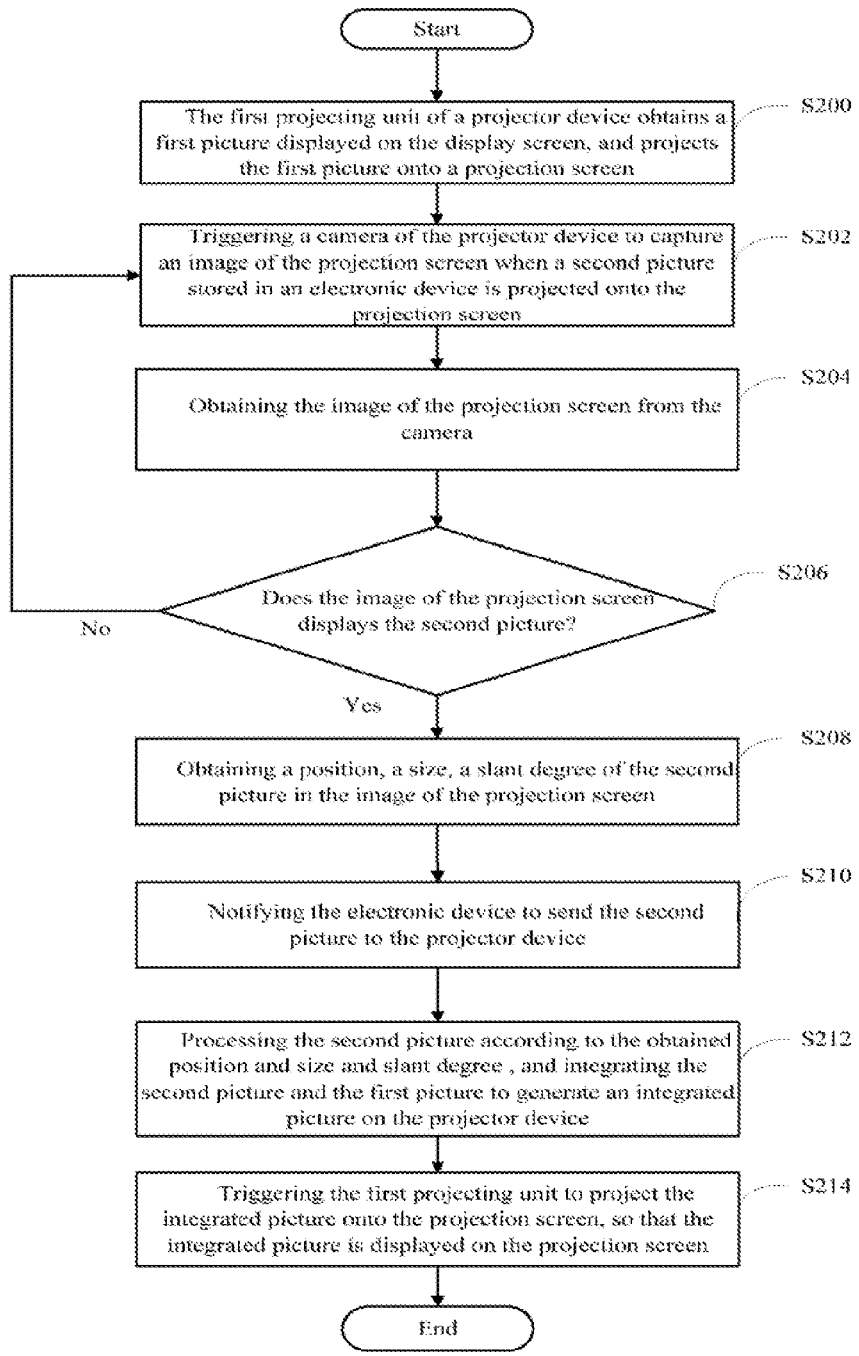
FIG. 3 is a flowchart of one embodiment of a method for projecting pictures on a projection screen.

FIG. 3 illustrates a flowchart of one embodiment of a method for projecting pictures to a projection screen using the projector device 1 of FIG. 1. Depending on the embodiment, additional steps may be added, others removed, and the ordering of the steps may be changed.

In block S200, the first projecting unit 16 of the projector device 1 obtains a first picture displayed on the display screen 20, and projects the first picture onto the projection screen 3.

In block S202, the first triggering module 100 triggers the camera 18 to capture an image of the projection screen 3 when a second picture is projected onto the projection screen 3. The second picture is stored in the electronic device 2 and is projected by the second projecting unit 12 of the electronic device 2.

In block S204, the obtainment module 102 obtains an image of the projection screen 3 from the camera 18.

In block S206, the determination module 104 determines whether the image of the projection screen 3 displays the second picture. In the embodiment, the Open Source Computer Vision Library (Open CV) is used to recognize the image of the projection screen 3 to determine whether the image of the projection screen 3 comprises the second picture. If the image of the projection screen 3 comprises the second picture, block 208 is implemented. Otherwise, if the image of the projection screen 3 does not comprise the second picture, the flow returns to the block S202.

In block S208, the analyzing module 106 obtains a position, a size, and a slant degree of the second picture in the image of the projection screen 3. In the embodiment, the position and the size of the second picture in the image of the projection screen 3 may be obtained by analyzing coordinates of vertexes (for example, A, B, C, D as shown in the FIG. 1) and a center point of the second picture based on a two-dimensional coordinate system (as shown in FIG. 1). The two-dimensional coordinate system is created by an origin point of an upper-left corner of the image of the projection screen 3. In the embodiment, the slant degree of the second picture may be obtained by computing a slope of a line between two opposite vertexes of the image of the projection screen 3, wherein the slope is relative to an X-axis of the above two-dimensional coordinate system.

In block S210, the notifying module 108 notifies the electronic device 2 to send the second picture to the projector device 1.

In block S212, the processing module 110 processes the second picture sent from the electronic device 2 according to the obtained position, size and slant degree of the second picture, and integrates the second picture and the first picture to generate an integrated picture on the projector device 1.

In block S214, the second triggering module 112 triggers the first projecting unit 16 to project the integrated picture onto the projection screen 3, so that the integrated picture is displayed on the projection screen 3.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A projector device, comprising:
   a first projecting unit;
   at least one processor;
   a camera; and
   one or more programs stored in a storage device and executed by the at least one processor, the one or more programs comprising:
   a first triggering module that triggers the camera to capture an image of the projection screen displaying a first picture when a second picture is projected onto the projection screen, wherein the first picture is projected by the first projecting unit, and the second picture is projected by a second projecting unit of an electronic device that communicates with the projector device;
   an obtainment module that obtains the image of the projection screen from the camera;
   an analyzing module that obtains a position, a size and a slant degree of the second picture in the image on the projection screen, if the image of the projection screen displays the second picture, wherein the slant degree of the second picture is obtained by computing a slope of a line between two opposite vertexes of the second picture;
   a notifying module that notifies the electronic device to send the second picture to the projector device;
   a processing module that integrates the first picture and the second picture to generate an integrated picture by processing the second picture sent from the electronic device according to the obtained position, size and slant degree; and
   a second triggering module that triggers the first projecting unit to project the integrated picture onto the projection screen.

2. The projector device according to claim 1, wherein the position and the size of the second picture in the image of the projection screen are obtained by analyzing coordinates of vertexes and a center point of the second picture based on a two-dimensional coordinate system.

3. The projector device according to claim 2, wherein the two-dimensional coordinate system is created by an origin point of an upper-left corner of the image of the projection screen.

4. The projector device according to claim 2, wherein the slope of the line between two opposite vertexes of the second picture is relative to an X-axis of the two-dimensional coordinate system.

5. A method for projecting pictures on a projection screen using a projector device, the method comprising:
   triggering a camera of the projector device to capture an image of the projection screen displaying a first picture when a second picture is projected onto the projection screen, wherein the first picture is projected by a first projecting unit of the projector device, and the second picture is projected by a second projecting unit of an electronic device that communicates with the projector device;
   obtaining the image of the projection screen from the camera;
   obtaining a position, a size and a slant degree of the second picture in the image on the projection screen, if an image of the projection screen displays the second picture, wherein the slant degree of the second picture is obtained by computing a slope of a line between two opposite vertexes of the second picture;
   notifying the electronic device to send the second picture to the projector device;
   integrating the first picture and the second picture to generate an integrated picture by processing the second picture sent from the electronic device according to the obtained position, size and slant degree; and
   triggering the first projecting unit to project the integrated picture onto the projection screen.

6. The method according to claim 5, wherein the position and the size of the second picture in the image of the projection screen are obtained by analyzing coordinates of vertexes and a center point of the second picture based on a two-dimensional coordinate system.

7. The method according to claim 6, wherein the two-dimensional coordinate system is created by an origin point of an upper-left corner of the image of the projection screen.

8. The method according to claim 6, wherein the slope of the line between two opposite vertexes of the second picture is relative to an X-axis of the two-dimensional coordinate system.

9. A non-transitory computer-readable storage medium having stored thereon instructions being executed by a processor of a projector device, causes the projector device to perform a method for projecting pictures on a projection screen, the method comprising:
   triggering a camera of the projector device to capture an image of the projection screen displaying a first picture when a second picture is projected onto the projection screen, wherein the first picture is projected by a first projecting unit of the projector device, and the second picture is projected by a second projecting unit of an electronic device that communicates with the projector device;
   obtaining the image of the projection screen from the camera;
   obtaining a position, a size and a slant degree of the second picture in the image on the projection screen, if an image of the projection screen displays the second picture, wherein the slant degree of the second picture is obtained by computing a slope of a line between two opposite vertexes of the second picture;
   notifying the electronic device to send the second picture to the projector device;
   integrating the first picture and the second picture to generate an integrated picture by processing the second picture sent from the electronic device according to the obtained position, size and slant degree; and
   triggering the first projecting unit to project the integrated picture onto the projection screen.

10. The storage medium according to claim 9, wherein the position and the size of the second picture in the image of the projection screen are obtained by analyzing coordinates of vertexes and a center point of the second picture based on a two-dimensional coordinate system.

11. The storage medium according to claim 10, wherein the two-dimensional coordinate system is created by an origin point of an upper-left corner of the image of the projection screen.

12. The storage medium according to claim 10, wherein the slope of the line between two opposite vertexes of the second picture is relative to an X-axis of the two-dimensional coordinate system.

* * * * *